July 4, 1944.            C. MILLER            2,352,798
REFRIGERATION
Filed Sept. 16, 1941
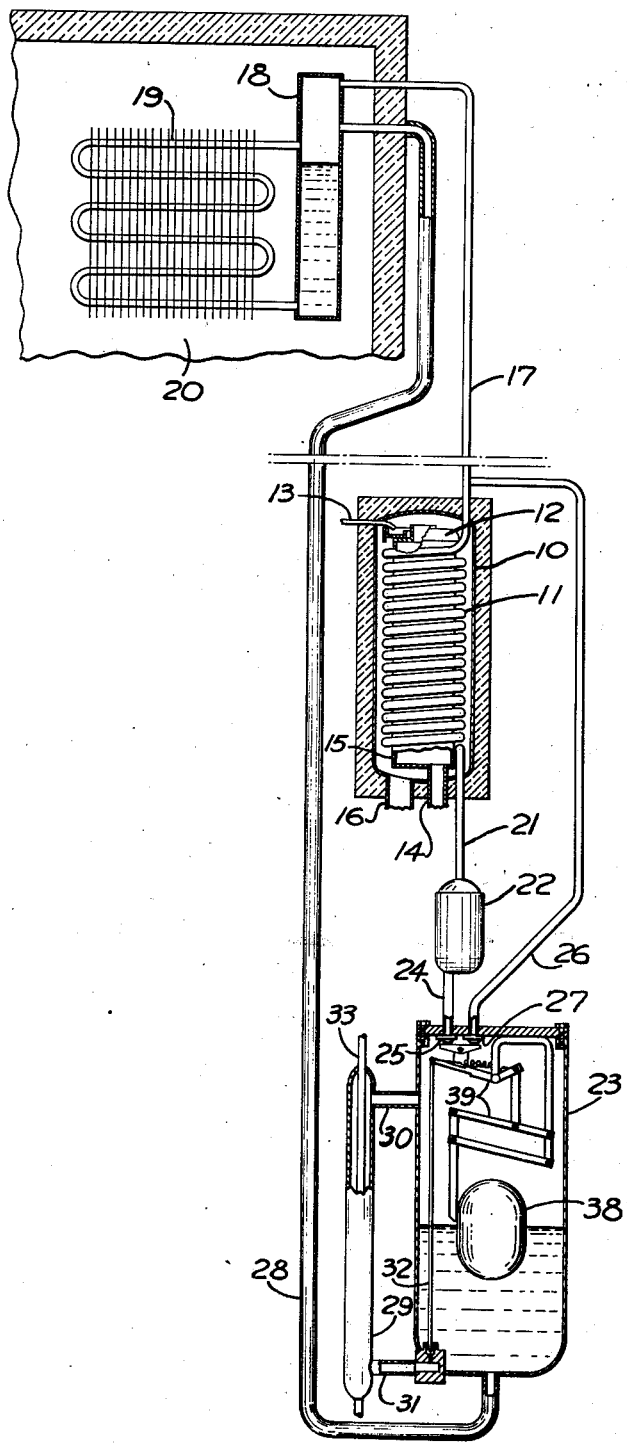
INVENTOR
Cary Miller
BY
D. S. Heath
his ATTORNEY Patented July 4, 1944

2,352,798

UNITED STATES PATENT OFFICE 2,352,798

REFRIGERATION

Cary Miller, Evansville, Ind., assignor to Servel, Inc., New York, N. Y., a corporation of Delaware Application September 16, 1941, Serial No. 410,970

6 Claims. (Cl. 62—125)

My invention relates to refrigeration and more particularly to transfer of a refrigerating effect from a place where it is produced to a place where it is to be used at a higher elevation.

It is an object of the invention to carry out such heat transfer by employing a vaporization-condensation circuit in which liquid is raised from a lower elevation to a higher elevation by pressure of vapor conservatively produced.

The single figure of the drawing shows more or less diagrammatically a heat transfer system embodying the invention.

At a lower elevation, such as in the basement of a store, there is located refrigeration apparatus including an evaporator or cooling element 10. The evaporator 10 is a part of a refrigerating apparatus like that shown and described in Patent No. 2,207,836 of A. R. Thomas to which reference may be had for explanation of operation of the system. The disclosure of said patent is hereby incorporated in the present specification. The evaporator 10 contains a pipe coil 11. Above pipe coil 11 is a liquid distributor 12. An inlet conduit 13 is arranged to direct liquid refrigerant into distributor 12. The liquid refrigerant is deposited by distributor 12 onto coil 11. The liquid descends over the outside of coil 11, evaporating and diffusing into an auxiliary pressure equalization fluid such as hydrogen. The evaporation of liquid on the outside of tube 11 produces cooling of fluid within the tube. Hydrogen enters evaporator 10 through a conduit 14 and flows to the top of the evaporator through a central pipe 15. The mixture of refrigerant vapor and inert gas leaves the bottom of evaporator 10 through a conduit 16.

The upper end of evaporator coil 11 is connected by a conduit 17 to a header 18. A finned heat transfer coil 19 is connected to header 18, and together therewith forms a second evaporator or cooling element. The evaporator 19 is located in an insulated refrigerator storage compartment 20 which may be a display case or walk-in cooler or the like on an upper floor of the store. The lower end of evaporator coil 11 is connected by a conduit 21 to the top of a vessel 22. Below vessel 22 there is a transfer vessel 23. The bottom of vessel 22 is connected by a conduit 24 to an inlet opening in the top of transfer vessel 23 controlled by a valve 25. The upper end of evaporator coil 11 is connected by a part of conduit 17 and a conduit 26 to another opening in the top of transfer vessel 23 controlled by a valve 27. The bottom of transfer vessel 23 is connected by a conduit 28 to the header 18 in the refrigerator 20.

Alongside of transfer vessel 23 there is a pressure vessel 29. The upper part of vessel 29 is connected to the upper part of vessel 23 by a conduit 30. The lower part of vessel 29 is connected to the lower part of vessel 23 by a conduit 31. Communication between vessels 23 and 29 through the lower conduit 31 is controlled by a valve 32 which is operated by the snap action leverage 39. When valve 25 and valve 27 are closed, valve 32 is open, and vice versa. A conduit 33 has a part inside of vessel 29. Vessel 29 jackets this part of conduit 33. Conduit 33 is adapted to conduct water which has been used to cool the refrigeration apparatus associated with the evaporator 10 so that the part of conduit 33 in vessel 29 heats liquid contained in this vessel.

The above described circuit is charged with a volatile transfer fluid such as, for instance, methyl chloride. When the refrigeration apparatus is operated as described in said Thomas patent, the coil 11 is cooled. This causes condensation of methyl chloride vapor in coil 11. Condensation of vapor in coil 11 causes a decrease in pressure in the circuit of which coil 11 is a part. Upon such decrease in pressure, liquid in coil 19 evaporates and causes cooling of the refrigeration compartment 20. Vapor resulting from this evaporation flows from the evaporator header 18 through conduit 17 into the condenser coil 11. Liquid condensate flows from the lower end of coil 11 through conduit 21 into the accumulation vessel 22. Assuming that float 38 is down so that valves 25 and 27 are open and valve 32 is closed, liquid flows from vessel 22 through conduit 24 into vessel 23. The surface level of liquid rises in vessel 23, raising float 38. During this time, generally referred to as a filling period, not all liquid is admitted into vessel 29 because valve 32 is closed. When float 38 has been raised to such an elevation that the valves are operated to the positions shown in the drawing, the liquid from vessel 23 flows through now open valve 32 and conduit 31 into vessel 29. Liquid in vessel 29 is heated by conduit 33. The resulting vapor flows through conduit 30 into vessel 23. Valves 25 and 27 now being closed, the vapor accumulation in vessel 23 creates a pressure which forces liquid in vessel 23 through conduit 28 into the evaporator header 18. As the liquid level goes down in vessel 23, float 38 descends and sets the valve operating mechanism so that valves 25 and 27 will snap open and valve 32 will snap closed when the pressure in vessel 23 is relieved by blowing liquid out of conduit 28. The size of vessel 29 should be such that all of the liquid therein is substantially vaporized during a transfer period. Thus, no liquid remains in vessel 29 at the end of the transfer period and, since valve 32 then closes down, no liquid enters the heated vessel 29 until the initiation of another transfer period as described.

Various changes and modifications may be made within the scope of the invention as set forth in the following claims.

What is claimed is:

1. A heat transfer system for transferring cooling from a source of refrigeration to a higher elevation including a condenser cooled by said source of refrigeration, an evaporator at said higher elevation, said evaporator always being in open communication with said condenser and connected to deliver vapor to the latter, a vessel connected to receive liquid condensate from said condenser, a conduit for conducting liquid from said vessel upward to said evaporator when said vessel is subjected to sufficient internal pressure to force liquid therefrom through said conduit to said upper elevation, a liquid vaporizer for supplying said pressure in said vessel, said vaporizer being connected to receive liquid from said vessel, and a valve for controlling flow of liquid from said vessel to said vaporizer and operated so that liquid flows to said vaporizer only upon rise in liquid level in said vessel.

2. A heat transfer system for transferring cooling from a source of refrigeration to a higher elevation including a condenser cooled by said source of refrigeration, an evaporator at said higher elevation connected to deliver vapor to said condenser, a transfer vessel having a liquid inlet and a vent in communication with said condenser, valves controlling said communication, float operated mechanism for opening and closing said valves responsive to decrease and increase respectively in level of liquid in said vessel, a conduit for conducting liquid from said vessel upward to said evaporator when said vessel is subjected to sufficient pressure to force liquid therefrom through said conduit to said upper elevation, a heated chamber communicating with said vessel for supply of vapor to the latter, and a valve for controlling admission of liquid to said chamber from said vessel and operated to open and close when said first valves close and open respectively.

3. A heat transfer system for transferring cooling from a source of refrigeration to a higher elevation including a condenser cooled by said source of refrigeration, an evaporator at said higher elevation, said evaporator always being in open communication with said condenser and connected to deliver vapor to the latter, a transfer vessel connected to receive liquid condensate from said condenser and deliver liquid upward therefrom to said evaporator at said higher elevation, a heated chamber communicating with said vessel for supply of vapor from said chamber to said vessel for displacing liquid from said vessel to said higher elevation, a connection for conducting liquid to said heated chamber, and a valve in said connection for controlling admission of liquid to said heated chamber and operative to open and close responsive to increase and decrease respectively in quantity of liquid in said vessel.

4. A heat transfer system for transferring cooling from a source of refrigeration to a higher elevation including a condenser cooled by said source of refrigeration, an evaporator at said higher elevation, said evaporator always being in open communication with said condenser and connected to deliver vapor to the latter, a transfer vessel connected to receive liquid from said condenser and deliver liquid therefrom to said evaporator at said higher elevation, a vaporizing chamber having a connection to the upper part of said vessel and a connection to the lower part of said vessel, and a valve controlling said last connection and operative to open and close responsive to rise and fall respectively of the surface level of liquid in said vessel.

5. A heat transfer system for transferring cooling from a source of refrigeration to a higher elevation including a condenser cooled by said source of refrigeration, an evaporator at said higher elevation, said evaporator always being in open communication with said condenser and connected to deliver vapor to the latter, a transfer vessel connected to receive liquid from said condenser and deliver liquid therefrom to said evaporator at said higher elevation, a vaporizing chamber in communication with said vessel so as to receive liquid therefrom and deliver vapor thereto to supply pressure in said vessel to displace liquid therefrom to said higher elevation, and valve mechanism controlling said communication and operative to open and close responsive to rise and fall respectively of the surface level of liquid in said vessel.

6. A heat transfer system for transferring cooling from a source of refrigeration to a higher elevation including a condenser cooled by said source of refrigeration, an evaporator at said higher elevation, said evaporator always being in open communication with said condenser and connected to deliver vapor to the latter, a transfer vessel connected to receive liquid from said condenser and deliver liquid therefrom to said evaporator at said higher elevation, a vaporizing vessel having small liquid capacity relative to that of said transfer vessel, said vessels being in communication at their upper parts for supply of vapor to said transfer vessel from said vaporizing vessel, said vaporizing vessel being connected to receive liquid by gravity flow from said transfer vessel, and valve mechanism for cutting off flow of liquid to said vaporizing vessel responsive to fall of surface level of liquid in said transfer vessel.

CARY MILLER.